Feb. 3, 1959 O. D. PAYNE, SR., ET AL 2,872,006

TAMPER-PROOF TELEVISION RECEIVER INSTALLATION

Filed May 10, 1956

INVENTOR
Oscar D. Payne, Sr.
Oscar D. Payne, Jr.

BY Wm. T. Wofford

ATTORNEY

United States Patent Office 2,872,006

Patented Feb. 3, 1959

2,872,006

TAMPER-PROOF TELEVISION RECEIVER INSTALLATION

Oscar D. Payne, Sr., and Oscar D. Payne, Jr., Fort Worth, Tex.

Application May 10, 1956, Serial No. 583,997

7 Claims. (Cl. 194—1)

Our invention relates to television receiver installations, and more particularly to means and arrangements for installing television receivers so as to render the installation tamper-proof.

Owners of coin operated television receivers installed in public lodgings, particularly in motels find their operating profits substantially curtailed because of damage to the installations due to tampering by guests. Tamper damage includes attempts to beat the coin mechanism, robbery of the coin box, deliberate destruction of working parts, malfunctions due to incompetent manipulation of special adjustments at rear of set, outright theft, etc.

It is accordingly a general object of our invention to provide a coin operated television receiver installation that will be tamper-proof.

More specifically it is an object of our invention to provide a wall mounted coin operated television receiver installation wherein the coin box is fully protected, no wires or leads are exposed, the receiver is locked in operating position in a tamper-proof manner, the rear of the set is completely inaccessible in the locked position, and the set is easily removable for servicing, coin collection, and minor adjustments.

Another object of our invention is to provide a strong, inexpensive, yet attractive and effective wall mounting frame for a television receiver.

These and other objects are effected by the invention as will be apparent from the following description taken in accordance with the accompanying drawings, forming a part of this application, in which.

Figures 1, 2, 3, 4:
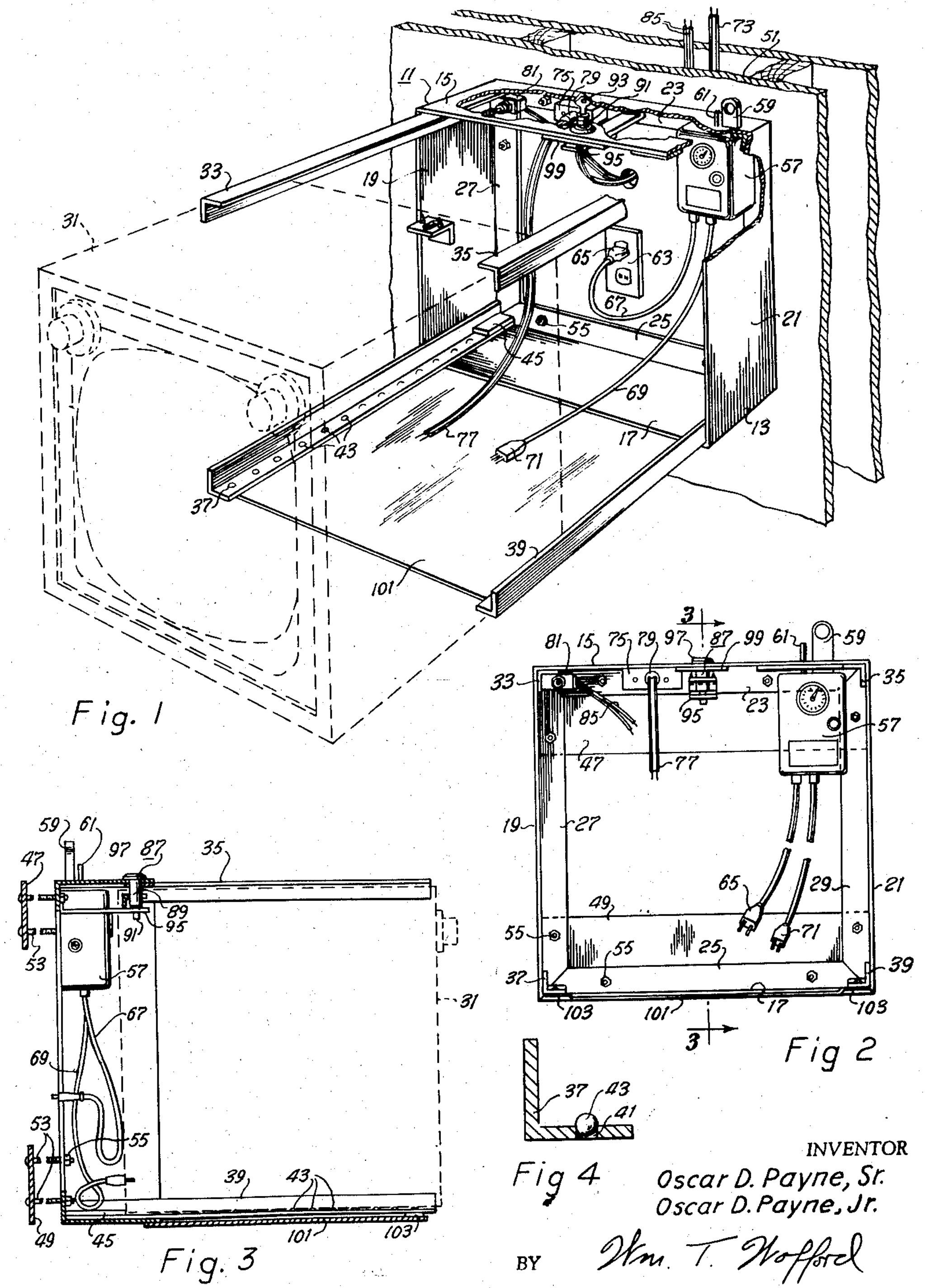
Fig. 1 is a perspective view, partially cut-away showing a tamper-proof wall-mounted installation in accordance with a preferred embodiment of the invention, with the television receiver shown in phantom.
Fig. 2 is a front elevational view of the installation of Fig. 1 with the set removed.
Fig. 3 is a section view taken at lines 3—3 of Fig. 2 with the set shown in phantom.
Fig. 4 is an enlarged section view showing a detail of the mounting frame.

The mounting frame 11 includes a housing portion 13 in the form of a shallow metal box having an open front (or top) and a rear (or bottom) having a centrally disposed rectangular opening therein. This housing 13 is formed from a single strip of heavy sheet metal having V-shaped notches at intervals on one long side. The metal between adjacent notches is then bent 90° on a line joining the notch apices and the strip is bent 90° at each notch on a line bisecting the notch so a rectangular box is formed. The strip ends and adjacent notch edges are joined by welding. Thus the housing 13 has upper and lower and left and right side walls, 15, 17, 19, 21 and end (bottom) flanges, 23, 25, 27, 29 respectively. The television receiver 31 to be mounted is supported by four equal lengths of angle iron. Each angle iron 33, 35, 37, 39 has one end portion placed so that its outer faces coincide with inner faces of adjacent housing side walls with the end of the angle iron butting against adjacent housing end flanges. Thus the four angle irons extend outwardly from the inside corners of the housing 13, parallel to each other and perpendicular to the housing end flanges. The angle irons are each securely fixed to the housing by welding. The housing side wall dimensions are made such that the line of intersection of the outside surfaces of the television receiver 31 will correspond substantially to the line of intersection of the angle iron inside surfaces, allowing for slide bearings to be hereinafter described. Thus the television receiver, herein sometimes referred to as the set 31, is received by the angle irons 33, 35, 37, 39 in a snug but not tight fitting manner. The horizontal side of each lower angle iron 37, 39 is provided with spaced holes 41 along its length. The top portion in each hole 41 is bevelled to receive a ball bearing 43. The bearings 43 are simply laid in the holes and make it easy to slide the set 31 in or out of the mount 11. The angle irons are of length such that they extend just short of the set front when the set is in the mounted and locked position. Stops 45 in the form of small metal blocks are welded to the lower angle irons 37, 39 at their rear end portions so that the set will always be stopped at a predetermined position when it is slid into the mount. The rear flanges of the housing are provided with spaced bolt holes. The housing may be bolted to a wall in any suitable manner. Preferably a pair of rectangular metal plates 47, 49 are placed on the back side of the wall 51 upon which the mount 11 is to be secured, and round-headed carriage bolts 53 extend through the plates 47, 49, then the wall 51 and then the housing flanges 23, 25, 27, 29 and are drawn tight by nuts 55 on the housing side. A coin-box-timer mechanism 57 of conventional type is bolted to the upper flange 23 of the housing with the coin slot 59 and coin return 61 projections extending up through openings in the housing upper side wall 15. Operating power is supplied from a wall receptacle 63 located within the flange enclosure via a plug 65 and a cord 67 which terminates in the timer 57, and a cord 69 emanating from the timer 57 and provided with a plug 71 which fits the power input receptacle at the rear of the set 31. The antenna lead in wire 73 extends inside the building wall 51 and terminates at an impedance matching device 75 which is mounted on the housing upper flange 23. A piece of antenna lead-in wire 77 having a plug 79 at one end connects the set signal input terminals to the impedance matching device 75 at a receptacle located at the front of the said device. An interlock switch 81 having an actuating button 83 adapted for co-operation with the back of the set 31 is fixed to the housing upper flange 23. Leads 85 from a central annunciator station are brought within the building wall 51 to the switch 81. The set 31 in locked position holds the interlock contacts open. When the set is moved slightly outward, the contacts close to actuate the annunciator or alarm at the central station.

The installation lock 87 is a conventional tubular screw type having an outer barrel 89 and a threaded core 91 which co-operates with threads inside the barrel. There can be relative screw movement between the core and the barrel only when a key 93 is inserted in the core. The outer surface of the barrel 91 has a plane surface portion. A hole is formed in the upper side wall 15 of the housing adjacent its center portion, conforming to the shape of the lock barrel 89. A similar and vertically aligned hole is formed in the top rear portion of the set 31. An angle bracket or lock bar 95 is fixed to the upper flange 23 of the housing and extends outwardly and through an opening in the receiver back and partially into the receiver 31. The lock bar 95 carries a threaded hole adjacent its end portion, which hole is vertically aligned with the hole in the housing upper side wall aforementioned. The lock barrel 89 has a flange 97 at its upper portion and is extended down through the openings in the housing and the set until the core threads contact the matching threads of the hole in the said bracket 95. The key 93 is then turned to screw the core 91 down into the bracket until the barrel flange 97 is drawn down snugly against the top surface of the upper housing wall 15. The set is now in the locked position. A rectangular metal strip 99 is welded to the inner face of the upper side wall in front of the lock barrel to make it substantially impossible to insert a saw to saw the lock 87 off. A thin metal plate 101 having offset corners 103 is fixed at its corners to the bottom surface of the lower angle irons. This plate covers the bottom of the set when it is in the locked position, preventing the poking of objects up into the set chassis through the vent holes in the bottom of the set. The plate 101 is spaced slightly below the angle iron lower surfaces to provide air circulation.

Although we have shown our invention in only one form it will be apparent to those skilled in the art that it is not so limited, but is susceptible of various changes and modifications without departing from the spirit thereof.

We claim:

1. A tamper-proof wall mount for a television receiver comprising a rectangular box formed from a single strip of heavy metal sheet material having four flap portions on one side, said strip being bent to form a shallow rectangular box open at the top and with said flaps being bent inward to form a partially open bottom, with all adjacent edges of said folded strip being rigidly fixed one to the other, four pieces of angle iron each having one end abutting the bottom of said box at a corner and having the end portion of its outside surfaces abutting the inside surfaces of adjacent walls, said angle irons extending outwardly from the top of said box in mutually parallel relation and forming a receptacle for removably receiving a television receiver cabinet, said strip being of sufficient width to cover the end portions of the receiver walls when the receiver is in normal operating position in said mount, and locking means extending within the box for locking said television receiver cabinet to said mount.

2. A tamper-proof wall mount for a television receiver comprising a rigid rectangular box of heavy metal sheet material having an open end and upper, lower, left, and right side walls, four lengths of angle iron each having the axis of its apex at an end portion substantially coincident with the line of intersection of the inside surfaces of adjacent said walls and being rigidly fixed to said respective walls with portions of said angle irons extending outwardly from the open end of said box in mutually parallel relation, said angle irons forming a receptacle for removably receiving a television receiver cabinet, said upper wall being adapted for rigid mounting of a coin box-timer assembly thereunder, with its coin slot extending upward through an opening in said wall, a lock bar fixed to said box and having a free end extending forwardly beneath said upper wall and spaced therefrom, said bar having a threaded opening adjacent its end portion, said upper wall having an opening therein aligned with an opening in the top wall of said receiver adjacent its rear edge portion and aligned with said threaded opening, and a barrel type lock received by said openings and having a threaded core engaging said threaded opening, said box side walls being of sufficient width to cover the end portions of the television receiver side walls when the receiver is in the locking position.

3. A tamper proof wall mount for a television receiver comprising a rigid rectangular box of heavy metal sheet material having an open end and upper, lower, left, and right side walls, four lengths of angle iron each having the axis of its apex at an end portion substantially coincident with the line of intersection of the inside surfaces of adjacent said walls and being rigidly fixed to said respective walls with portions of said angle irons extending outwardly from the open end of said box in mutually parallel relation, said angle irons forming a receptacle for removably receiving a television receiver cabinet, said upper wall being adapted for rigid mounting of a coin box-timer assembly thereunder, with its coin slot extending upward through an opening in said wall, a lock bar fixed to said box and having a free end extending forwardly beneath said upper wall and spaced therefrom, said bar having a threaded opening adjacent its ends portion, said upper wall having an opening therein aligned with an opening in the top wall of said receiver adjacent its rear edge portion and aligned with said threaded opening, and a barrel type lock received by said openings and having a threaded core engaging said threaded opening, and stop means on said mount for stopping said receiver in a predetermined position, said box side walls being of sufficient width to cover the end portions of the television receiver side walls when the receiver is in the locking position.

4. A tamper-proof wall mount for a television receiver comprising a rigid rectangular box of heavy metal sheet material having an open end and upper, lower, left, and right side walls, four lengths of angle iron each having the axis of its apex at an end portion substantially coincident with the line of intersection of the inside surfaces of adjacent said walls and being rigidly fixed to said respective walls with portions of said angle irons extending outwardly from the open end of said box in mutually parallel relation, said angle irons forming a receptacle for removably receiving a television receiver cabinet, said upper wall being adapted for rigid mounting of a coin box-timer assembly thereunder, with its coin slot extending upward through an opening in said wall, a lock bar fixed to said box and having a free end extending forwardly beneath said upper wall and spaced therefrom, said bar having a threaded opening adjacent its end portion, said upper wall having an opening therein aligned with an opening in the top wall of said receiver adjacent its rear edge portion and aligned with said threaded opening, and a barrel type lock received by said openings and having a threaded core engaging said threaded opening, and a metal block fixed to the inner surface of said upper wall in front of said lock, said block being of sufficient thickness to fill the space between said upper wall and the top surface of the cabinet of said receiver, said box side walls being of sufficient width to cover the end portions of the television receiver side walls when the receiver is in the locking position.

5. A tamper-proof wall mount for a television receiver comprising a rigid rectangular box of heavy metal sheet material having an open end and upper, lower, left, and right side walls, four lengths of angle iron each having the axis of its apex at an end portion substantially coincident with the line of intersection of the inside surfaces of adjacent said walls and being rigidly fixed to said respective walls with portions of said angle irons extending outwardly from the open end of said box in mutually parallel relation, said angle irons forming a receptacle for removably receiving a television receiver cabinet, said upper wall being adapted for rigid mounting of a coin box-timer assembly thereunder, with its coin slot extending upward through an opening in said wall, a lock bar fixed to said box and having a free end extending forwardly beneath said upper wall and spaced therefrom, said bar having a threaded opening adjacent its end portion, said upper wall having an opening therein aligned with an opening in the top wall of said receiver adjacent its rear edge portion and aligned with said threaded opening, and a barrel type lock received by said openings and having a threaded core engaging said threaded opening, and a thin metal plate bridging the space between said lower angle irons and offset to allow air circulation below said receiver, said box side walls being of sufficient width to cover the end portions of the television receiver side walls when the receiver is in the locking position.

6. A tamper-proof wall mount for a television receiver comprising a rectanglar hoop of heavy metal sheet material, an end closure integral with said hoop, said end closure being made of heavy metal sheet material and having an opening therein, a length of angle iron rigidly fixed to said hoop at each intersection of the surfaces of adjacent hoop sides and extending outwardly therefrom and mutually parallel, said angle irons forming a receptacle for removably receiving a television receiver in horizontal sliding relation, means for rigidly securing said mount to a wall, stop means to limit rearward movement of said receiver in said receptacle, said mount being adapted to receive a timer and coin box assembly fixed thereto and enclosed within said hoop, means extending within the hoop for locking said receiver to said mount, said hoop being of sufficient width to cover the end portions of the receiver walls when in the locking position.

7. A tamper proof wall mount for a television receiver comprising a rigid rectangular box of heavy sheet material having a partially open end and upper, lower, left, and right side walls, four lengths of angle iron each having the axis of its apex at an end portion substantially coincident with the line of intersection of the inside surfaces of adjacent said walls and being rigidly fixed to said respective walls with portions of said angle irons extending outwardly from the open end of said box in mutually parallel relation, said angle irons forming a receptacle for a television receiver cabinet, a coin box timer assembly mounted within said box with its coin slot protruding outwardly of said box, a lock bar fixed to said box and extending forwardly from a wall of said box and spaced therefrom, aligned openings in a wall of said box and a wall of said receiver adjacent said lock bar, and a flush front type lock means extending through said openings for locking to said lock bar, said box side walls being of sufficient width to cover the end portions of the television receiver side walls when the receiver is in the locked position.

References Cited in the file of this patent

UNITED STATES PATENTS

| | | |
|---|---|---|
| Re. 21,462 | Andres | May 28, 1940 |
| 343,774 | Moore | June 15, 1886 |
| 1,261,507 | Gabriel | Apr. 2, 1918 |
| 1,328,112 | Barchi | Jan. 13, 1920 |
| 1,618,052 | Canada | Feb. 15, 1927 |
| 1,934,380 | Schmitz | Nov. 7, 1933 |
| 2,176,374 | Brown | Oct. 17, 1939 |
| 2,258,308 | Williams | Oct. 7, 1941 |
| 2,427,012 | Lum | Sept. 9, 1947 |
| 2,496,620 | Curry | Feb. 7, 1950 |